(12) United States Patent
Vargas et al.

(10) Patent No.: US 6,881,083 B2
(45) Date of Patent: Apr. 19, 2005

(54) RACEWAY SYSTEM WITH SELECTIVELY PLACED OUTLET DEVICES

(75) Inventors: Antonio J. Vargas, Tolland, CT (US); Joe A. Milheiro, West Hartford, CT (US); James McClellan, Harvard, MA (US)

(73) Assignee: The Wiremold Company, West Hartford, CT (US)

(*) Notice: Subject to any disclaimer, the term of this patent is extended or adjusted under 35 U.S.C. 154(b) by 0 days.

(21) Appl. No.: 10/200,070

(22) Filed: Jul. 19, 2002

(65) Prior Publication Data

US 2004/0014340 A1 Jan. 22, 2004

(51) Int. Cl.[7] ............................................... H01R 4/60
(52) U.S. Cl. ...................................... 439/211; 174/48
(58) Field of Search ................................... 439/209, 207, 439/211, 658, 120, 107, 135; 52/287.1, 282.1, 716.1, 716.6, 718.01, 718.03, 716.01; 174/48–49, 101

(56) References Cited

U.S. PATENT DOCUMENTS

| | | | | |
|---|---|---|---|---|
| 4,017,137 A | * | 4/1977 | Parks | 439/211 |
| 5,336,849 A | * | 8/1994 | Whitney | 174/48 |
| 5,614,695 A | * | 3/1997 | Benito Navazo | 174/48 |
| 5,688,132 A | * | 11/1997 | Rogers et al. | 439/209 |
| 6,259,020 B1 | * | 7/2001 | Ashline et al. | 174/48 |
| 6,323,421 B1 | * | 11/2001 | Pawson et al. | 439/114 |
| 6,350,135 B1 | * | 2/2002 | Acklin et al. | 439/211 |
| 6,384,327 B1 | * | 5/2002 | Bellanger | 439/207 |
| 6,576,834 B1 | * | 6/2003 | Coutant et al. | 174/48 |

FOREIGN PATENT DOCUMENTS

| | | | | |
|---|---|---|---|---|
| GB | 2229869 | * | 3/1990 | 439/211 |

* cited by examiner

Primary Examiner—P. Austin Bradley
Assistant Examiner—Felix O. Figueroa
(74) Attorney, Agent, or Firm—McCormick, Paulding & Huber, LLP

(57) ABSTRACT

A metal two piece raceway has a base with inturned marginal edges that receive cover segments designed to mold therewith. The cover segments are spaced at selected location to receive a device bracket therebetween, and the device bracket receives an outlet device that is connected to through wires in the raceway base the device bracket is secured in place by wings that define at least in part channels for receiving depending ribs formed for this purpose in a unique cover that locks the assembly in place in a manner that has both aesthetic and functional advantages.

2 Claims, 6 Drawing Sheets

RACEWAY SYSTEM WITH SELECTIVELY PLACED OUTLET DEVICES

BRIEF DESCRIPTION OF PRIOR ART

Raceway systems have been available with set spacing between electrical outlets, and such raceways generally have outlets for electrically connecting in electrical series. See for example the PLUGMOLD Raceway Systems sold by The Wiremold Company of West Hartford, Conn., and U.S. Pat. No. 4,017,137. A typical PLUGMOLD System comprises a two piece metal raceway that includes a raceway base adapted to be secured to a wall, and raceway cover segments that snap on the base. Further improvements to that system have been devised in the form of a plastic raceway, with a hinged cover having equally spaced outlets. These PLUG-MOLD Raceway products are generally provided in electrical series with one another within the raceway.

SUMMARY OF THE INVENTION

The present invention relates generally to a two piece metal raceway system, and deals more particularly with such a raceway system having capable of placing electrical outlets, or telecommunication/data outlets, in selected locations along the raceway, rather than being limited to a fixed predetermined spacing between these outlets as in the PLUGMOLD products of the prior art, and such as required in the labor intensive installation required in larger raceway systems. See Wiremold U.S. Pat. Nos. 5,336,849 and 6,323,421.

In accordance with the present invention a unique device bracket is provided for snapping into the raceway base between raceway cover segments such that a device bracket cover cooperates with the device bracket to not only overlap the adjacent ends of the raceway cover segments, but also serves to lock the device bracket in the raceway base, and to hold the outlet device itself in that device bracket.

DETAILED DESCRIPTION OF FIGS. 1–3

Figure 1:
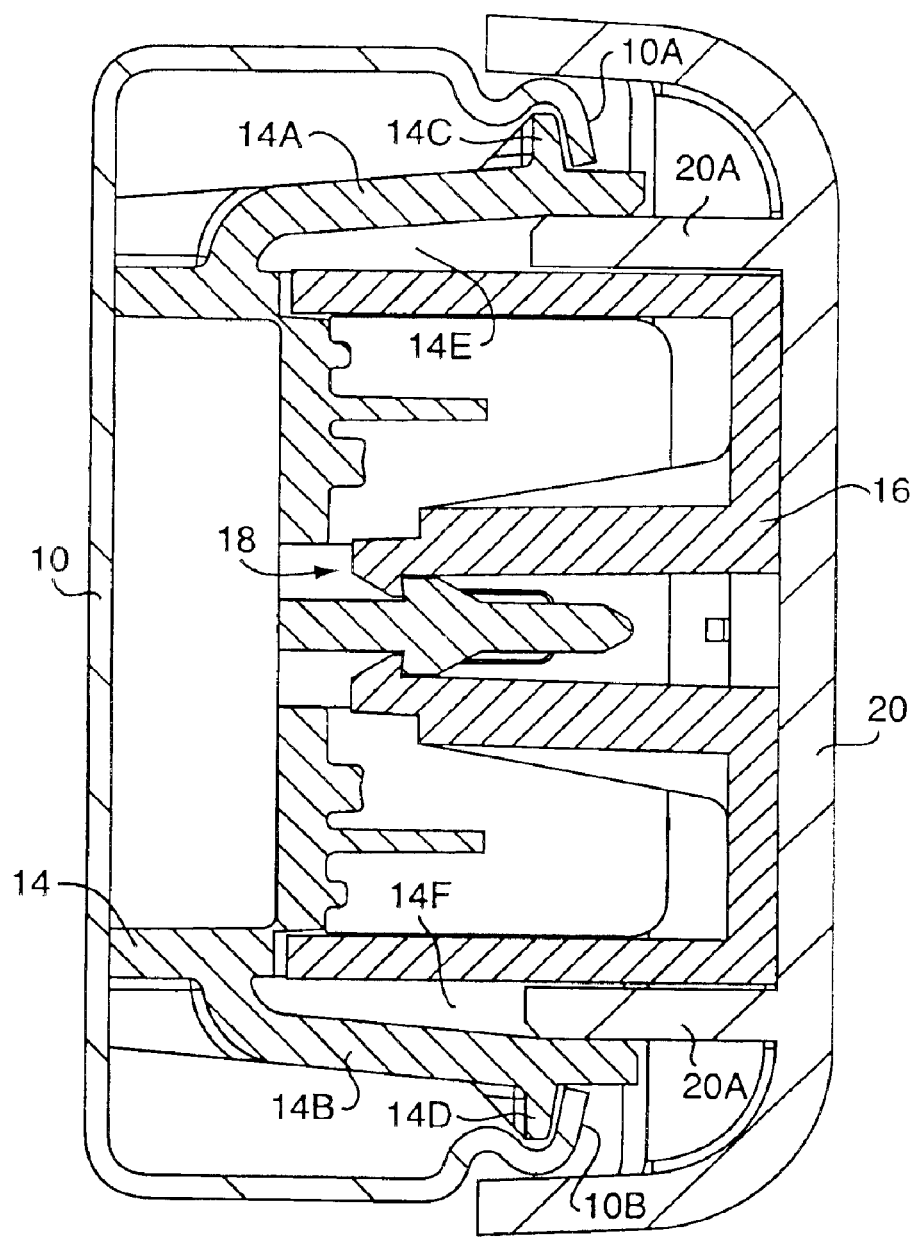
FIG. 1 is a cross sectional view through a two piece metal raceway at the point in the raceway base where the outlet device is provided in a device bracket and held in place by a device bracket cover. See line 1—1 of FIG. 3.
Figure 2:
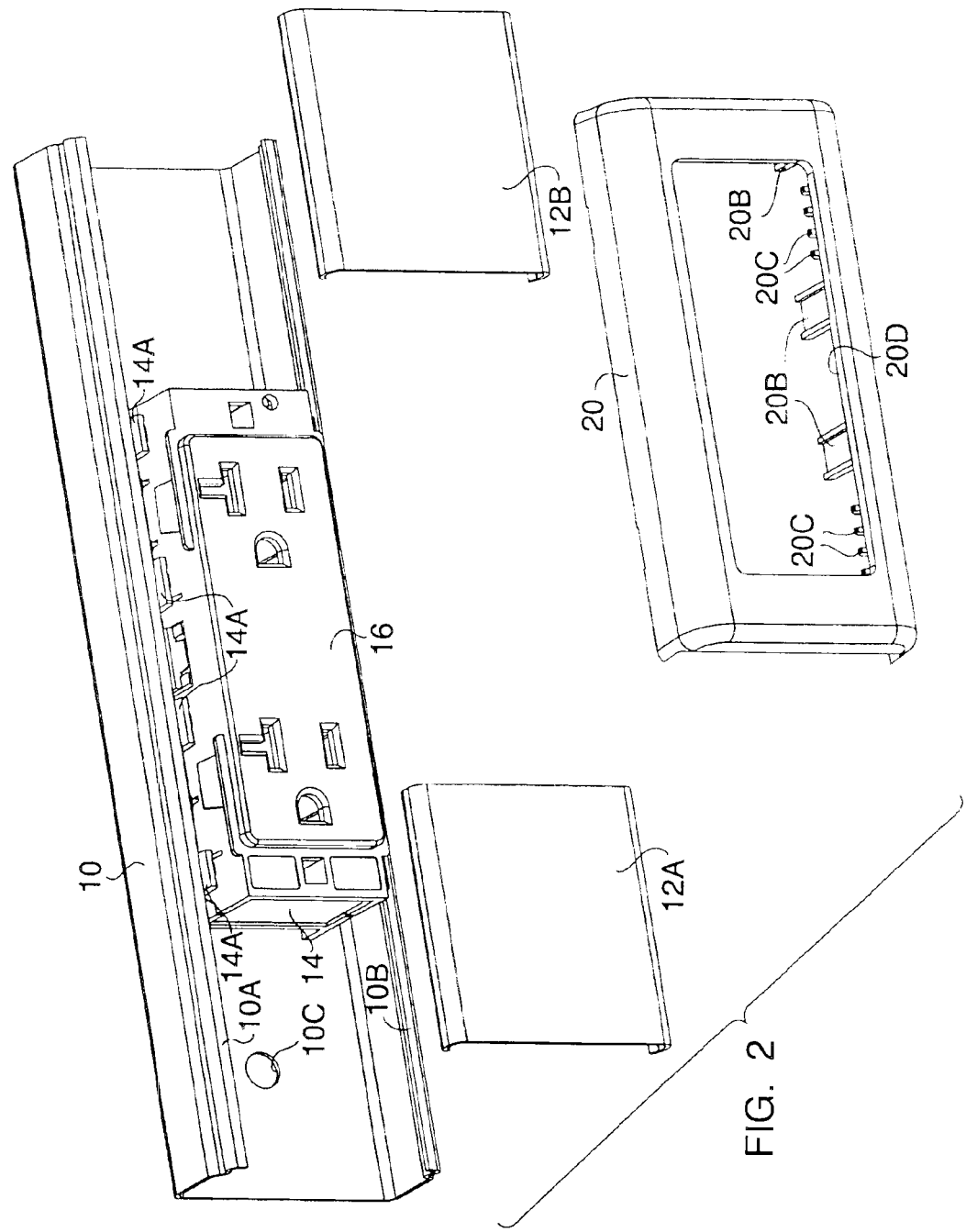
FIG. 2 is a perspective exploded view of the two piece raceway and shows a duplex outlet device provided at a point on the raceway selected by the installer, rather than being predetermined and dictated only by the manufacturing process.
Figure 3:
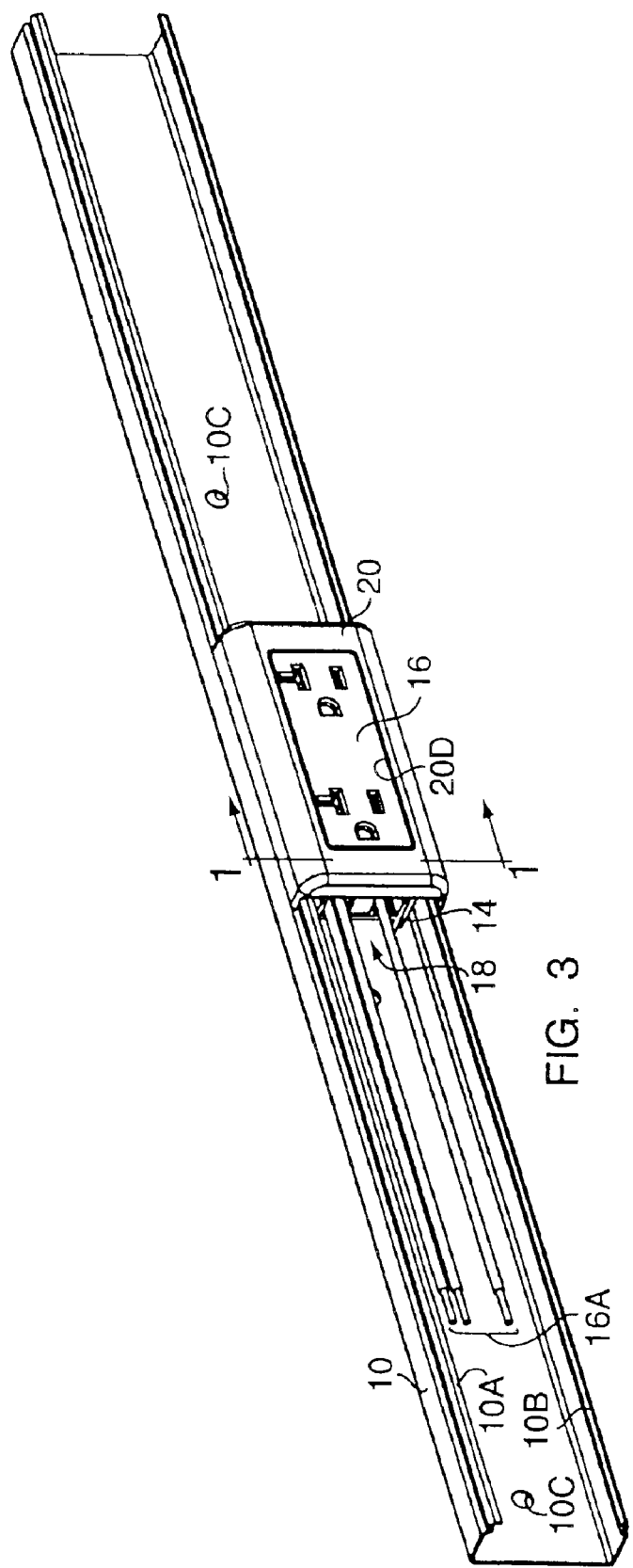
FIG. 3 is view similar to FIG. 2 but shows the same components with the raceway cover segments removed.

Turning now to FIGS. 1–3 of the drawings in greater detail, a two piece metal raceway of conventional geometry of the type now sold by Wiremold under its trademarked series designation numeral 2400 is illustrated. Such a raceway system includes a base 10, which is forwardly open as seen in FIG. 2, and has marginal edges that are adapted to receive raceway cover segments $12_A$ and $12_B$.

In accordance with the present invention these raceway segments $12_A$ and $12_B$ do not meet, but are left with a gap therebetween so as to receive a device bracket shown in detail in FIG., 1.

FIG. 3 shows the raceway base 10 with S-shaped marginal edges as shown at $10_A$ and $10_B$ so as to define relatively stiff but nevertheless resilient grooves for receiving the complementary formed marginal edges of the raceway cover segments (only one of which is shown).

In accordance with the present invention the base 10 would be secured to a wall (not shown) by fasteners provided in the openings $10_C$ provided for this purpose. The installer would then insert a device bracket of the type shown in greater detail in FIG. 1 at 14. The device bracket 14 is in turn adapted to receive an electrical outlet device of the type indicated generally at 16 in FIG. 1. The device 16 snaps into the device bracket as indicated generally at 18, and defines electrical outlet ports of suitable size, shape and configuration to receive a male connector plug (For example the electrical power outlet duplex device illustrated in FIG. 2 at 16) would receive a conventional male power plug.

As best shown in FIGS. 1 and 2, the device bracket 14 includes laterally outwardly projecting resilient wings $14_A$ and $14_B$ which in turn define tabs $14_C$ and $14_D$ that respectively interact with the inturned marginal edges $10_A$ and $10_B$ of the base 10 to hold the device bracket 14 in place during installation.

Figure 4:
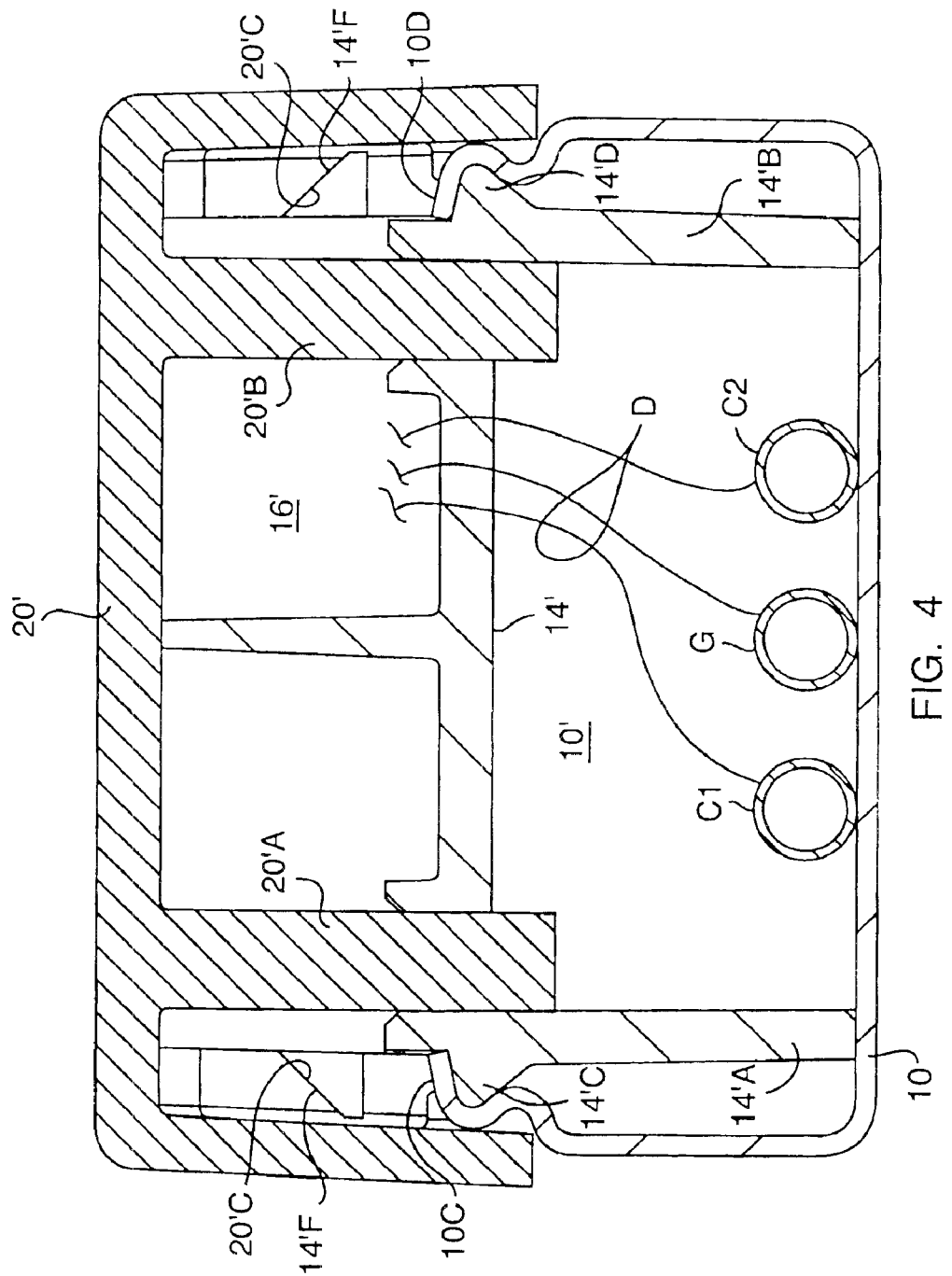
FIG. 4 is a cross sectional view through a two piece metal raceway at the point in the raceway where a conventional outlet device is provided in another embodiment of our device bracket that has features similar to those in the device bracket of FIGS. 1–3, and that defines channels for receiving ribs defined by the cover to secure the components in the raceway base.

The electrical outlet device 16 carries lead wires $16_A$ that are adapted to be electrically connected to through conductors (as shown in FIG. 4) by conventional means, such as wire nuts for example. The lead wires $16_A$ are connected to the conductors in accordance with conventional practice for raceways of this general type. In accordance with the present invention the lateral sidewalls of the outlet device 16 cooperate with the wings $14_A$ and $14_B$ of the device bracket 14 to define outwardly open channels $14_E$ and $14_F$ that are adapted to receive depending ribs $20_A$ and $20_B$ in the outlet device cover 20. These ribs $20_A$ and $20_B$ serve to spread the wings $14_A$ and $14_B$ so that these wings interlock with the marginally inturned edges of the raceway base 10 to provide a secure assembly. The cover also defines notched abutments $20_C, 20_C$ adjacent the opening $20_D$ in which the outlet device fits (compare FIG. 2 with FIG. 3). These notched abutments receive resilient tabs $16_C, 16_C$ for holding the cover in assembled relation to the outlet device 16. Thus, the outlet device 16, and the cover 20 are interlocked with the device bracket 14 and the raceway base 10.

Although device brackets have been utilized in the past, which are adapted to be received by a raceway and more particularly to include resilient wings that interact with ribs of the alike in the raceway base, the provision for a cover 20 that has ribs $20_A$ and $20_B$ that serves to anchor the resilient wings in place is believed to be novel, and when taken in combination with the capability for providing custom located outlets along a two piece raceway generally, gives to the present invention significant architectural and utilitarian advantages not available from prior art raceway systems generally.

In light of the above, it is therefore understood that within the scope of the amended claims the invention maybe practiced otherwise than as specifically described.

DETAILED DESCRIPTION OF FIGS. 4–6

Figure 5:
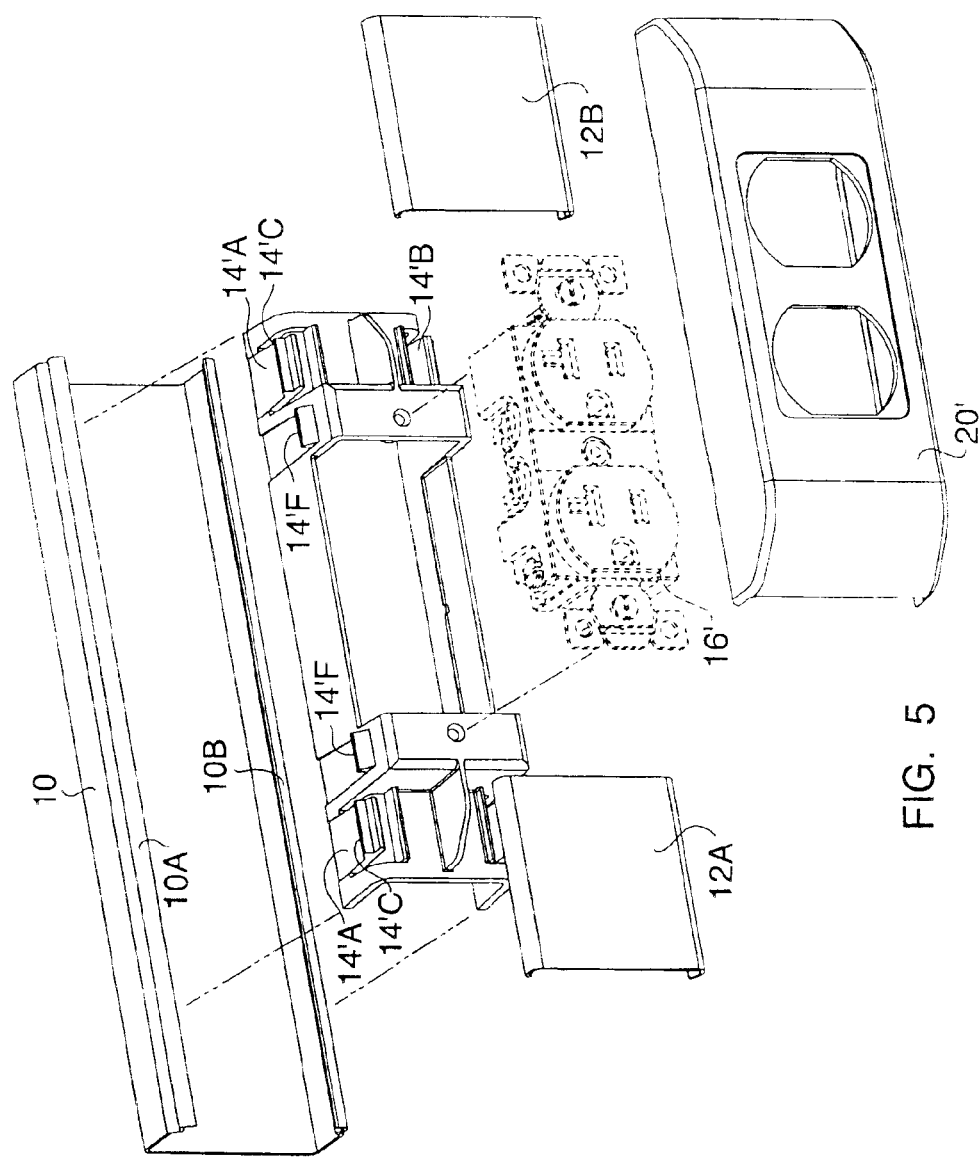
FIG. 5 is an exploded perspective view showing how the components of FIG. 4 are assembled.
Figure 6:
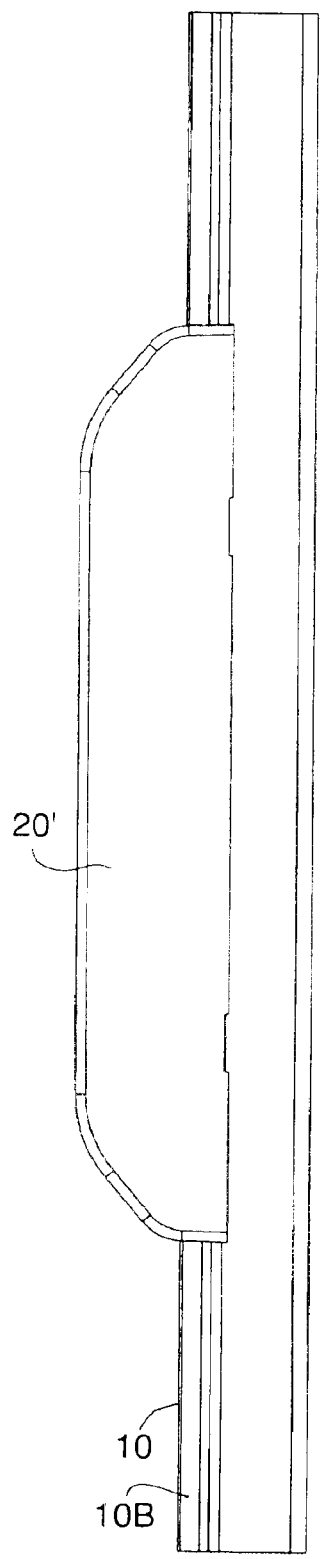
FIG. 6 is a side view of the FIG. 5 assembly.
Figure 7:
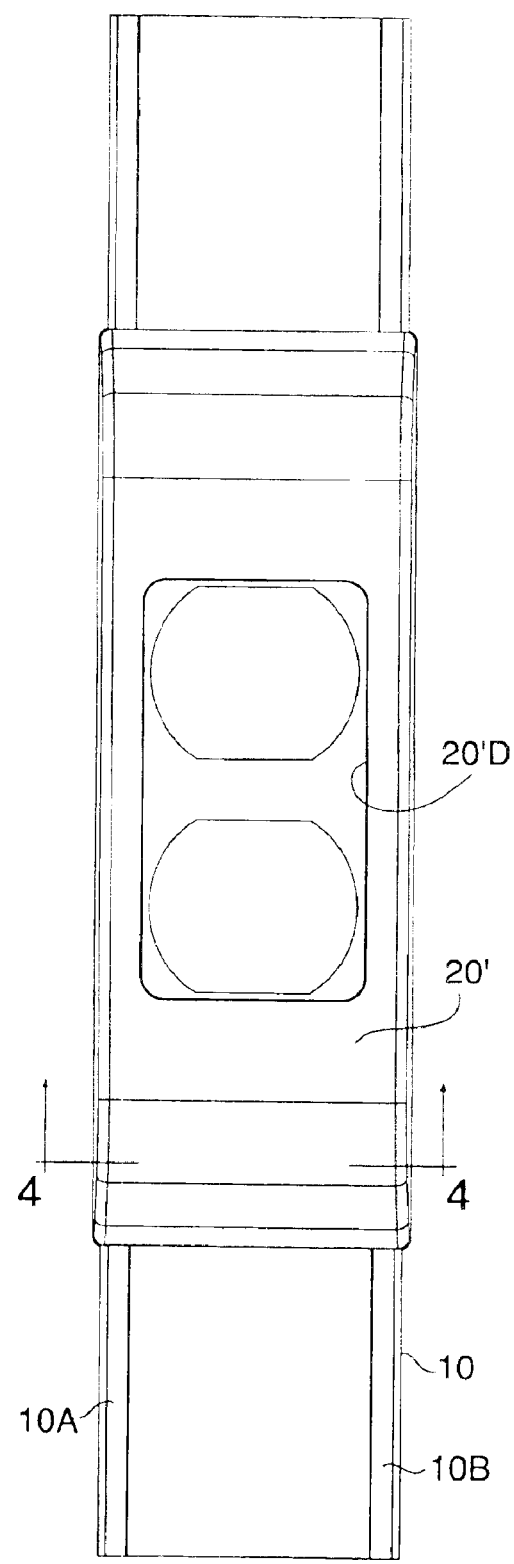
FIG. 7 is a top plan view of the FIG. 5 assembly.

Turing now to the alternative embodiment illustrated in FIGS. 4–6, a two piece metal raceway of conventional geometry is again illustrated, and such a raceway includes a base 10 which is forwardly open when mounted on a wall surface on the like as suggested in FIG. 5. Marginal edge portions of the raceway base 10 are illustrated at $10_C$ and $10_D$ and are configured in an "S" shape so that the exterior of the marginal edges can receive a conventional raceway cover segment such is shown for example at $12_b$ and $12_A$ in FIG. 5. Still with reference to FIG. 5 these raceway segments do not meet, but are left with a gap therebetween so as to receive a device bracket 14' to be described.

As in the previously described embodiment of FIGS. 1–3, the raceway base 10 is adapted to be secured to a wall (not shown) by fasteners provided in openings defined for this purpose in the rear wall of this base. The installer would then insert a device bracket of the type shown in FIG. 5 at 14', the device bracket 14' having resiliently deformable wing portions $14'_A$ and $14'_B$ which allow the device bracket to be snapped inside the raceway base, at least in part due to the resiliency of the sidewalls of the base, and in part due to the resiliency of these wings $14'_A$ and $14'_B$.

As in the previously described embodiment the device bracket 14' is adapted to receive an electrical outlet device 16', such as that illustrated in perspective broken lines in FIG. 5, and as shown in full lines in FIG. 4. The device 16' defines conventional electrical outlet ports for receiving a conventional male connector plug.

As in the previously described embodiment the device bracket 14' includes the resilient wings $14'_A$ and $14'_B$ which inturn define tabs $14'_C$ and $14'_D$ that engage the edge of the base 10 to hold the device bracket 14' in place during the installation process.

As in the previously described embodiment, lead wires for the electrical outlet device 16' are adapted to be connected with through conductors within the raceway base, more particularly in the space afforded at 10' between the rear wall of the raceway base and the underside of the device bracket 14' (see FIG. 4). The through conductors are illustrated in FIG. 4 at $C_1$ and $C_2$ and G. The electrical outlet device 16' is thus shown to be connected electrically to these conductors at installation as suggested by the lead wires depicted generally at D.

In accordance with the present invention, and consistent with the disclosure of FIGS. 1–3 described previously, the outlet device 16' has a cover 20' similar to the cover 20 and includes depending ribs $20'_A$ and $20'_B$ which are received in cavities or channels defined at least part by the device bracket 14'. As in the previously described embodiment the device bracket 14' defines an upright post that cooperates with a complementary shaped opening in the device 16', but instead of relying upon the device 16' to define, in part, the channels or cavities for receiving the ribs $20'_A$ and $20'_B$, this function is served solely by the shape of the device bracket 14' itself as best shown in FIG. 4. The cover 20', like cover 20 of the previous embodiment, as means for securing this cover 20' in assembled relationship. Integrally formed abutments define notches similar to those described above with reference to the cover 20 of FIGS. 2 and 3. (See FIG. 4 at $20'_C$). Because the FIG. 4 version of our invention accommodates and industry standard duplex outlet device 16', the device bracket itself 14', is provided with interacting abutments $14'_F$ to hold the cover in place. The cover 20' sidewalls provide the resiliency required to achieve this interlocking feature.

Thus, and in accordance with the present inventions, the resilient wings $14'_A$ and $14'_B$ are locked in place by the ribs $20'_A$ and $20'_B$, yielding significant improvements in the integrity of the overall structure, and significant improvements in the architectural and utilitarian advantages to this invention.

In conclusion the embodiment of FIGS. 1–3 shows a device bracket 14 of the type that is held in assembled relationship with a raceway mounted outlet devices such outlet devices have long been available from The Wiremold Company of West Hartford, Conn. under their SNAPICOIL trademark. FIGS. 4–6 illustrate a conventional duplex outlet device of the type mounted in a wall outlet by conventional fasteners of the like. The two embodiments of cover and device bracket shown illustrate how the present invention can be adapted to both of these outlet devices. Other outlet devices can also be accommodated within the scope of the present invention, as for example, data/communication outlet ports and/or jacks, or other style electrical outlets, without departing from the scope of the claims which define the our invention.

We claim:

1. A two piece raceway system comprising a base having a U-shaped cross sectional configuration, said base having sidewalls defining marginal edge portions that include inturned lips, and raceway cover segments having end portions, and having marginal edge portions that cooperate with the marginal edge portions of the raceway base to define an enclosed raceway for wiring, at least one device bracket adapted to be received within the raceway base and between said end portions of the raceway cover segments, said device bracket including resilient wings for cooperating with the inturned marginal edge portions of the raceway base; an electrical device adapted to be received in the device bracket, and defining female outlet means for connecting wiring within the raceway to a male plug, and a cover for the electrical device and the device bracket, and defining internal ribs that are adapted to be received in channels, said channels being defined solely by said device bracket whereby said cover can overlay the raceway base, the electrical device and the said end portions of said raceway cover segments.

2. The combination of claim 1 further including means for interlocking the device bracket with the cover and the outlet device in said raceway base.

* * * * *